Sept. 5, 1967  J. M. LIND  3,339,878
FLOATING LIDS FOR BREAD BAKING PANS
Filed Dec. 23, 1965
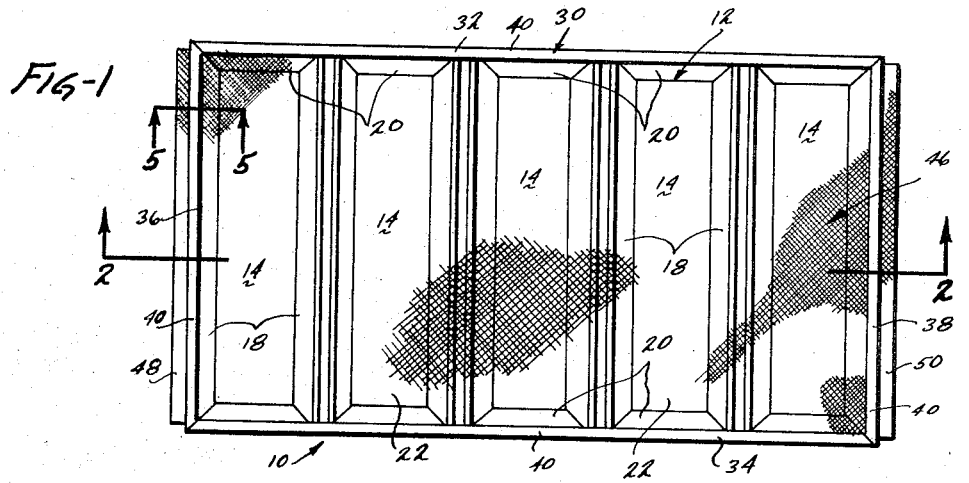
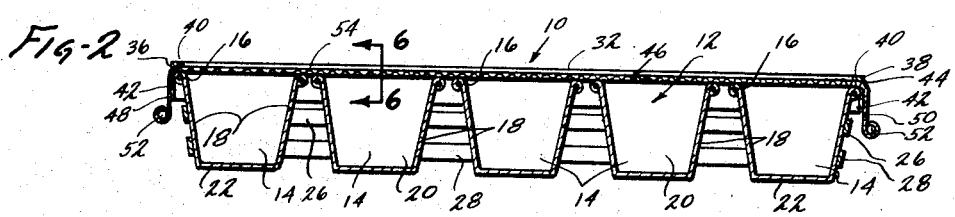
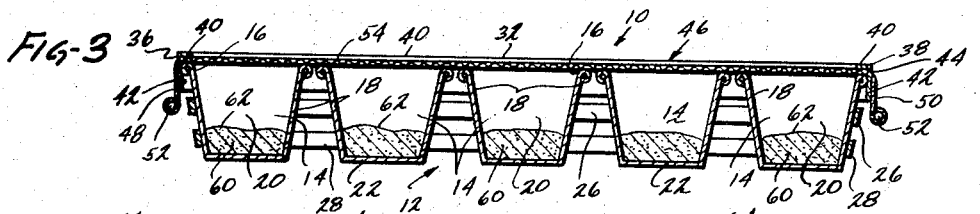
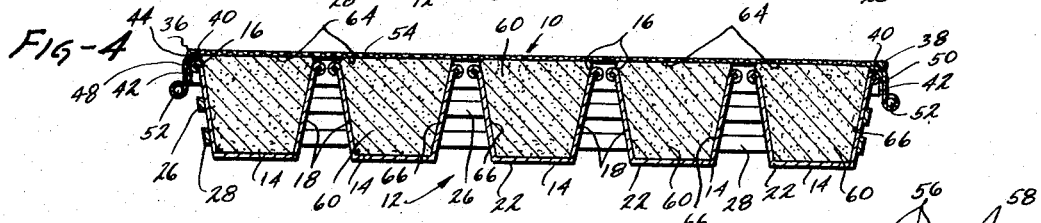
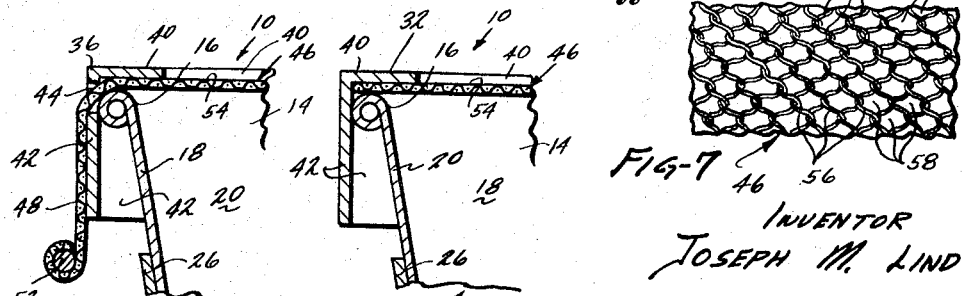
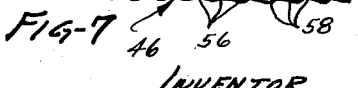
INVENTOR
JOSEPH M. LIND
BY Herzig, Walsh & Blackham
ATTORNEYS

United States Patent Office 3,339,878
Patented Sept. 5, 1967

3,339,878
FLOATING LIDS FOR BREAD BAKING PANS
Joseph M. Lind, 400 N. Sycamore St.,
Los Angeles, Calif. 90036
Filed Dec. 23, 1965, Ser. No. 515,930
5 Claims. (Cl. 249—82)

The present invention relates to floating lids for bread baking pans and more particularly to mesh lids which permit rising bread in several pans to level off at a height determined by the rising rate in each individual loaf.

At one time, leavened bread was baked on a hearth without a pan permitting the heat from a fire to caramelize the surface of the bread forming a heavy crust over all portions thereof except the small portion upon which the loaf rested during the baking operation. This method of baking bread results in a loaf having a distinctive flavor still considered by many to be characteristic of leavened bread.

It was then found that, by using open-top pans of uniform size, a plurality of loaves could be produced having a uniform size and having more height than was obtained with open-hearth baking methods. Bread baked in an open pan has a different taste and flavor than bread baked without a pan. This taste and flavor is considered by many to be less desirable than the taste and flavor of bread baked without a pan.

It was then thought desirable by many to produce a loaf of bread having a square slice facilitating the making of sandwiches. Such bread is well known today as the "sandwich" or "Pullman" loaf. Sandwich loaves are given a flat top by placing a solid lid on a baking pan so that the loaf cannot rise beyond the lid. Such lids maintain a fixed height regardless of the rising rate of the loaf. Consequently, the rising force in a particular dough piece sometimes peters out weakening the sidewall of the loaf so that it caves in.

When a lid is used, a much less desirable crust is obtained than that which may be obtained by baking in an open-top pan. Thus, the sandwich loaf is considered by many to have yet a third taste and flavor which is less desirable than that found in either the open-hearth bread or the bread baked in an open-top pan.

It has been found that, when bread is baked employing a lid of the type known in the prior art, the top of the pan is colder than the bottom of the pan. This necessitates employing 25-100° F. more top heat than is necessary when open-top pans are used. Thus, it is apparent that, although the sandwich loaf has an advantageous shape, it has the disadvantages that carmelization of the crust and flavor is sacrificed and the shape of the loaf is sometimes unattractive by virtue of the weakened, caved sidewalls and a concave topwall.

In view of the foregoing factors and conditions characteristic of lids for baking pans, it is a primary object of the present invention to provide a new and useful lid for baking pans not subject to the disadvantages enumerated above and having a mesh construction especially designed for permitting individual loaves of bread to level off at their own height regardless of their rising rate.

Another object of the present invention is to provide means for restraining the rising loaf without interfering with heat circulation through the open top of a baking pan.

Yet another object of the present invention is to provide a single, wire mesh lid for a plurality of open-top baking pans which will permit each loaf to level off at a height determined by the rising rate of each loaf.

The features of the present invention which are believed to be novel are set forth with particularity in the appended claims. In the following specification, certain structures which might be adopted in the practice of the present invention shall be referred to, but no attempt is made to specify all of which may be employed, the object and intent of this description being mainly to instruct others to carry out the invention in its presently preferred form and to enable them to fully comprehend its nature and general character. It is to be understood that specific mention of some modifications is in no wise intended to exclude others not referred to, but which result within the spirit and scope of the invention, viewed in its broadest aspect, and as defined in the appended claims. The present invention, both as to its organization and manner of operation, together with further objects and advantages thereof, may best be understood by reference to the following description, taken in connection with the accompanying drawings, in which like reference characters refer to like elements in the several views.

In the drawings:

FIG. 1 is a plan view of a lid of the present invention in combination with a strap of five baking pans;

FIG. 2 is a cross-sectional view taken along line 2—2 of FIG. 1;

FIG. 3 is a cross-sectional view similar to FIG. 2 showing dough pieces in each pan;

FIG. 4 is a view similar to FIG. 3 showing the dough pieces rising above the pans;

FIG. 5 is an enlarged, partial cross-sectional view taken along line 5—5 of FIG. 1;

FIG. 6 is an enlarged, partial cross-sectional view taken along line 6—6 of FIG. 2; and FIG. 7 is an enlarged plan view of a portion of the lid of FIG. 1 showing its mesh construction.

Referring again to the drawings, a cover means or lid constituting a presently preferred embodiment of the invention, generally designated 10, is shown in position on a strap of five baking pans 12.

Such pans are well known and comprise five individual elongated pans 14 each having an open top 16, parallel, spaced-apart sidewalls 18, end walls 20 and a bottom wall 22. The pans 14 are connected together in parallel, spaced-apart relation by an upper band 26 and a lower band 28, both of which encompass the set of five pans.

The cover means 10 includes a frame 30 having parallel, spaced-apart side rails 32 and 34 and parallel, spaced-apart end rails 36 and 38. Each of the rails 32, 34, 36 and 38 includes a horizontal flange 40 and a vertical flange 42 which retains the cover means 10 in position on the pans 12.

Each of the flanges 42 for the end rails 36, 38 is provided with an elongated slot 44 through which a mesh or net-like member 46 extends. The mesh 46 includes a first end 48 which extends through one of the slots 44 and a second end 50 which extends through the other slot 44. The ends 48 and 50 each carry a weighted rod 52 which maintains the mesh 46 in a taut condition across the open tops 16 of the several pans 14 with the edges 54 of the mesh 46 underlying the flanges 40.

Although a number of different types of materials and guages may be employed in the mesh 46, it has been found that steel mesh having individual strands 56 from about $\frac{1}{64}$ to about $\frac{1}{4}$ inch diameter is satisfactory. The mesh 46 may have a weave similar to that employed in chain mail. A plurality of openings 58 are formed between the individual strands 56 providing a substantially open cover for the pans 14 so that baking heat is free to circulate through the open top 16 of each pan 14 and around a dough piece 60 provided therein so that the surface 62 of each loaf 60 will be caramelized to the degree found in bread baked in open-top pans, as distinguished from bread baked in Pullman covered pans. As each dough piece 60 rises during the baking operation, it will contact the taut mesh 46 causing the dough piece to level out to the corners of the pans 14 so that a substantially flat top results, as indicated at 64 in FIG. 4.

The mesh 46 gives sufficiently upwardly to accommodate loaves having greater rising rates than others so that each loaf levels off at its own height regardless of the rising rate in a particular loaf. The mesh 46 gives enough so that the rising force in the dough pieces 60 will not peter out weakening the sidewalls 66 of the loaves, but will be uniformly resisted only by the mesh which gives a certain amount.

While the particular lid for baking pans herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. In combination with an elongated, open-top baking pan for baking leavened bread which rises during the baking process, lid means comprising:
   cover means for covering said open top, said cover means having a mesh construction defining a plurality of openings extending over a substantial portion of said open top, said cover means being displaceable upwardly by said rising bread; and means maintaining said cover means in a taut condition.

2. A combination as stated in claim 1 including frame means encompassing said open top, said frame means having a pair of spaced-apart, parallel end rails, slots provided in said end rails and wherein said cover means extends through said slots and under said frame.

3. A combination as stated in claim 2 wherein said means for maintaining said cover means in a taut condition comprises a weghted rod carried by each end of said cover means.

4. A combination of stated in claim 3 wherein said cover means comprises a wire mesh having a gauge of approximately 1/64 inch to approximately 1/4 inch.

5. A combination as stated in claim 4 wherein said cover means is in combination with a strap of five baking pans each having an open top.

References Cited
UNITED STATES PATENTS

| | | | |
|---|---|---|---|
| 2,071,845 | 2/1937 | Kowolski | 249—121 X |
| 2,082,973 | 6/1937 | Prabell | 249—121 X |
| 2,314,176 | 3/1943 | Talalay | 249—82 |
| 3,291,873 | 12/1966 | Eakin | 249—82 |

J. SPENCER OVERHOLSER, *Primary Examiner.*

HOWARD J. FLINT, JR., *Examiner.*